Patented Dec. 26, 1950

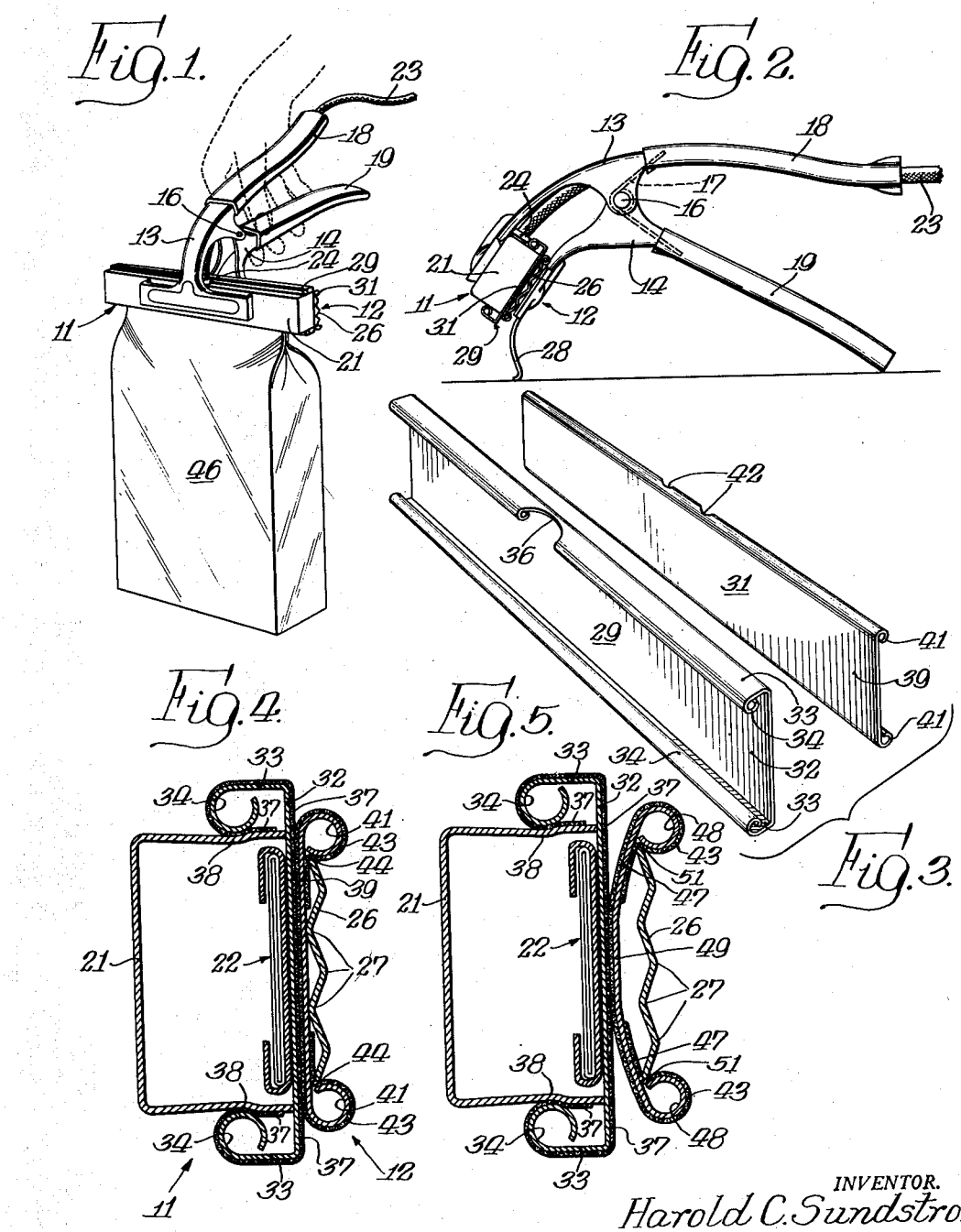

2,535,171

UNITED STATES PATENT OFFICE 2,535,171

HEAT SEALING DEVICE

Harold C. Sundstrom, Chicago, Ill.

Application January 31, 1950, Serial No. 141,515

10 Claims. (Cl. 154—42)

This invention relates to heat sealing devices, and more particularly to novel means for increasing the usefulness and improving the operating characteristics of such devices.

Heat sealing techniques have been widely used in various industries, particularly in the food industry, for sealing bags or packages of coated paper, cellophane, rubber hydrochloride, and other thermoplastic packaging materials. More recently cold storage freezers have become increasingly popular for home use, and to facilitate sealed packaging of food for home storage various heat sealing devices of a small portable nature have been made available. In general, such devices comprise a pair of manually operable spring-pressed metal jaws which are electrically heated and adapted to be clamped momentarily over the edges of the bag or package, the heated metal surfaces of the jaws being in direct contact with the portion of the bag or package being sealed.

However, it has been found that such devices wherein the heated metal clamping jaws are in direct contact with the bag or package do not function satisfactorily in all cases because of a marked tendency for the metal jaws to stick or adhere to certain types of packaging material or wrappers. For example, although a heat sealing device of this character will operate in a satisfactory manner on cellophane bags, considerable difficulty is encountered with sticking when it is attempted to use the device on a bag of polyethylene.

Accordingly, a primary object of the invention is to provide means for heat sealing packaging materials which avoids the previously encountered difficulties due to sticking as described above.

A further object of the invention is to provide a heat sealing device of the general character described which is capable of satisfactory use with a wide variety of packaging materials.

Another object of the invention is to provide, in detachable combination with a heat sealing device of the character described, a simple inexpensive means for preventing the heated metal surfaces of the sealing device from sticking to the packaging material.

An additional object of the invention is to provide means for detachably securing a protective fabric layer over the metal contact surfaces of a heat sealing device of the character described whereby to prevent sticking of the packaging material to said metal surfaces during use of the device.

Still another object of the invention is to provide an improved method of heat sealing sheet-like packaging material whereby the previously encountered difficulties with sticking of the packaging material to metal parts of the sealing mechanism are avoided.

Other objects and advantages of the invention will become evident from the subsequent detailed description of the invention and the accompanying drawings wherein:

Fig. 1 is a perspective view of a heat sealing device embodying one specific form of my invention and showing the general manner in which the device is used in sealing the top of a bag;

Fig. 2 is a side elevational view of the device;

Fig. 3 is an exploded perspective view on an enlarged scale of a pair of detachable elements of the device shown in Figs. 1 and 2;

Fig. 4 is a transverse cross sectional view of the device on an enlarged scale; and Fig. 5 is a sectional view similar to Fig. 4 but showing a slightly different modification of my invention.

Briefly, the principal feature of my invention resides in the provision of a pair of detachable clip members over the clamping jaws of a portable heat sealing device of the type hereinbefore described as being particularly suited for home or household use, in combination with suitable protective fabric coverings, the clip members serving to retain the protective fabric coverings over said jaws during use of the device. By thus interposing a suitable fabric layer between the heated metal surfaces of the sealing and clamping members and the packaging material, I am able to avoid the difficulties heretofore encountered with sticking or adherence of the packaging material to the metal surfaces.

Referring first to Figs. 1 to 4 of the drawing, the specific form of the invention shown therein by way of illustration comprises a pair of elongated jaws or sealing elements, indicated generally at 11 and 12, and a pair of handle portions 13 and 14 rigidly attached thereto and extending angularly therefrom for manual operation of the device. As will appear hereinafter, the jaw 11 is electrically heated whereas the cooperating jaw 12 is heated indirectly by conduction from the jaw 11 during use of the device. The handle portions 13 and 14 are pivotally attached, as by pin 16, and a tension spring 17 is provided on the pin 16 with its end portions in operative engagement with the handles 13 and 14 for normally urging the jaws 11 and 12 toward closed position with substantially uniform sealing pressure. A pair of hollow handle grips 18 and 19 of rubber or like insulating material are frictionally fitted at the outer operating ends of the handle portions 13 and 14, respectively, for insuring comfortable and safe manipulation of the device.

The jaw 11 is in the form of an elongated rectangular metal enclosure or housing 21 which is open at its inner face and which has disposed therein a resistance heating element which may be of the elongated strip type, as shown at 22 in Fig. 4. Electric current is supplied to the heating element 22 by means of an attachment cord 23 extending through the handle grip 18 and along the inner side of the handle portion 13. An insulator 24 is fitted in a wall of the housing 21 for protecting the electric wires of the attachment cord 23 at its point of entry into the housing 21. The cooperating jaw 12 is in the form of an elongated metal plate or strip 26 which is coextensive with the housing 21 and is provided with a plurality of longitudinal corrugations or humped portions, as indicated at 27 in Fig. 4. A stand or support 28 (Fig. 2) projects outwardly from the jaw 12 for permitting the device to be supported on the surface of a table or the like without danger of damage to the surface by the heated jaws.

As a principal feature of my invention, a pair of elongated detachable clip members 29 and 31 are provided which have a generally U-shaped transverse cross-section and are adapted to be fitted at the innermost opposed faces of the jaws 11 and 12, respectively. The clip 29 comprises a flat central portion or strip 32 adapted to overlie and to close the open inner face of the housing 21 (Fig. 4) with the adjacent surface of the heater strip 22 in close heat-conducting contact therewith. The longitudinal edges of the clip 29 are bent outwardly to form short side portions 33 and the outermost edge portions are turned or rolled inwardly, as at 34, to provide a pair of resilient parallel beads. A portion of one side edge of the clip 29 is cut away, as at 36 (Fig. 3), to accommodate the insulator 24 when the clip is in assembled position on the jaw 11.

An elongated strip of protective fabric 37 is disposed over the center portion 32 of the clip 29 at the outer face thereof and the side edges of the strip 37 extend outwardly along the side portions 33 and are wrapped around the inturned edges or beads 34 whereby the fabric 37 is frictionally retained or gripped between the beads 34 and the adjacent side walls of the housing 21. A pair of cooperating elongated indentations, indicated at 38, are provided in side walls of the housing 21 for receiving the beads 34 whereby to grip the edges of the fabric 37 more tightly and thereby retain the same in taut condition.

The fabric 37 may be any suitable natural or synthetic material which has little or no affinity for the packaging material under heat sealing temperatures and which, therefore, will not tend to stick or adhere to the package when the jaws of the device are unclamped after completion of a heat sealing operation. In addition, the fabric 37 must, of course, be capable of resisting temperatures encountered as a result of the heating element 22. I have found that nylon meets these requirements and functions very satisfactorily with all types of packaging materials, particularly with polyethylene. However, although nylon is the preferred material for the fabric 37, it is also within the scope of the invention to use other synthetic or natural fabrics having the required non-adherent and heat-resistant properties.

The clip 31 comprises a flat central portion 39 adapted to overlie and fit against the inner face of the corrugated plate 26 and the side edges of the clip 31 are rolled or turned outwardly to provide elongated parallel retaining beads 41, one of the beads 41 having a pair of recesses 42 (Fig. 3) cut away to permit the clip 31 to fit closely around the attached handle portion 14. A strip of fabric 43, similar to the strip 37, extends over the outer face of the central portion 39 and is wrapped at its side edges around the beads 41 and extends between the corrugated plate 26 and the opposite face of the central portion 39. The beads 41 are thus positioned in resilient engagement with the longitudinal side edges of the plate 26 with the fabric 43 tightly gripped therebetween, as indicated at 44 in Fig. 4, for retaining the fabric in taut condition.

In the operation of the device, the jaws 11 and 12 are opened and clamped over the edges of the package to be sealed, as shown in Fig. 1 by a bag 46 formed from an appropriate heat sealable packaging material such as cellophane, rubber hydrochloride, wax or plastic coated paper, polyethylene, or other sheet-like thermoplastic material. When the heated jaw 11 is at operating temperature a few seconds of clamping pressure between the jaws of the device will suffice to effect an air-tight heat sealed closure of the package, the cooperating jaw 12 being heated by conduction from the heated jaw 11. During the clamping operation it will be seen that the metallic sealing surfaces of the clips 29 and 31 are prevented from directly contacting the bag 46 or other packaging material by means of the interposed fabric layers 37 and 43. In other words, the edge portions of the bag 46 which are to be sealed are directly contacted on opposite sides only by the non-adherent fabric layers 37 and 43 and when the clamping jaws are opened there is no tendency for the jaws to stick or adhere to the package because of the previously mentioned properties of the fabric.

The clips 29 and 31 are frictionally retained on the jaws 11 and 12 as a result of the resilient pressure of the beads 34 and 41 against the sides of the housing 21 and the plate 26, respectively. Consequently, the clips 29 and 31 may be readily detached from their corresponding jaws in order to permit removal, replacement, or adjustment of the fabric layers. In the event that a packaging material such as cellophane is being used which does not present a sticking problem, it will be understood that, if desired, the fabric layer 37 may be removed and the entire clip 31 and its fabric layer 43 may also be detached thereby permitting the outer face of the clip 29 and the plate 26 to contact the packaging material directly during use of the device. The corrugations 27 on the plate 26 serve to concentrate the clamping pressure along longitudinal lines and, therefore, result in a crimped seal of the flexible packaging material.

In Fig. 5, a modified form of my invention is illustrated wherein the clip attached to the jaw 12 comprising the corrugated plate 26 is of slightly different design. In this instance, the clip has a generally bowed or curved shape transversely of its longitudinal dimension, as indicated at 47, and the side edges of the clip are rolled to form parallel beads 48 as in the first form of the invention. A narrow longitudinal center portion of the clip is flattened, as at 49, so that contact pressure is exerted against the coacting central portion 32 of the clip 29 only through the flattened surface 49. The fabric 43 extends over the flattened surface 49 and the curved portions 47 and is wrapped around the beads 48 whereby the fabric is tightly gripped between the beads 48 and the edges of the corrugated plate 26, as indicated at 51. This form of the invention may be particularly useful where it is desired to obtain a somewhat narrower heat sealed portion under somewhat greater clamping pressure, the increased clamping pressure being the result of the bowed construction of the clip attached to the jaw 12.

It will be seen that my invention provides a simple inexpensive means for detachably securing to the jaws of a heat sealing device a protective fabric having little or no affinity for the packaging material. Accordingly, the difficulties and disadvantages hitherto encountered with sticking of the packaging material to the clamping jaws are eliminated. Furthermore, the range of utility of the heat sealing device is greatly increased since by attaching or detaching the clips and the associated fabric layers the device can be readily used with any type of packaging material.

Although the invention has been described in connection with certain specific structural embodiments thereof, it will be understood that various modifications and equivalent structures may be resorted to without departing from the scope of the invention as defined in the appended claims.

I claim:

1. A heat sealing device of the character described comprising a pair of heated clamping jaws adapted to be clamped over the edges of a container comprising a heat sealable packaging material, cooperating clip means detachably securable to said jaws, and a protective fabric disposed over the contact surfaces of said clip means and retained in place thereon by said clip means whereby direct contact of said surfaces with the packaging material is avoided during use of the device.

2. A heat sealing device of the character described comprising a pair of heated clamping jaws adapted to be clamped over the edges of a container comprising a heat sealable packaging material, and a pair of clip members detachably fitted over the coacting faces of said jaws, said clip members cooperating with said jaws for retaining a protective fabric covering over the latter whereby to avoid direct contact of said jaws with the packaging material during use of the device.

3. Retaining means for use in combination with a heat sealing device having a pair of elongated clamping jaws adapted to be clamped over the edges of a container formed from a heat sealable packaging material, said means comprising a pair of elongated detachable clips adapted to frictionally grip said jaws longitudinally of the latter for retaining a protective fabric covering over the coacting surfaces of said jaws whereby to avoid direct contact of said jaws with the packaging material during use of the device.

4. A heat sealing device of the character described comprising a pair of elongated spring-pressed jaws adapted to be clamped over the edges of a container comprising a heat sealable packaging material, a pair of elongated clip members in detachable engagement with said jaws, said clip members having a generally U-shaped transverse cross section and overlying the adjacent coacting surfaces of said jaws, and protective fabric coverings extending over the outer faces of said clip members, said fabric coverings being gripped between said jaws and said clip members for retaining said coverings in place whereby direct contact of said surfaces with the packaging material is avoided during use of the device.

5. A heat sealing device of the character described comprising a pair of elongated spring-pressed jaws adapted to be clamped over the edges of a container comprising a heat sealable packaging material, a pair of elongated clip members of generally U-shaped transverse cross section disposed in detachable engagement with said jaws, said clip members having flat coacting central portions overlying the clamping surfaces of said jaws and having inturned longitudinal side edges in frictional engagement with the longitudinal sides of said jaws, and protective fabric coverings extending over said coacting portions for preventing direct contact of said surfaces with the packaging material during use of the device, said fabric coverings being gripped between said inturned edges and said longitudinal sides of said jaws.

6. A heat sealing device of the character described comprising a pair of elongated spring-pressed jaws adapted to be clamped over the edges of a container comprising a heat sealable packaging material, a pair of elongated clip members of generally U-shaped transverse cross section disposed in detachable engagement with said jaws, said clip members having flat coacting central portions overlying the clamping surfaces of said jaws and having their longitudinal side edges rolled inwardly of the clip members to provide parallel resilient beads, said beads being disposed in resilient frictional engagement with the longitudinal sides of said jaws, and elongated strips of a protective fabric extending over said coacting portions of said clip members with the sides of said strips being wrapped around said beads and being frictionally gripped between said beads and the adjacent sides of said jaws for retaining the fabric in place whereby direct contact of said surfaces with the packaging material is avoided during use of the device.

7. A heat sealing device of the character described comprising a pair of elongated spring-pressed jaws adapted to be clamped over the edges of a container comprising a heat sealable packaging material, a pair of elongated clip members in detachable engagement with said jaws, said clip members having a generally U-shaped transverse cross section and overlying the adjacent coacting surfaces of said jaws, one of said clip members being transversely bowed and having a flattened longitudinal center portion for exerting contact pressure toward the other clip member, and protective fabric coverings extending over the outer faces of said clip members, said fabric coverings being gripped between said jaws and said clip members for retaining said coverings in place whereby direct contact of said surfaces with the packaging material is avoided during use of the device.

8. A heat sealing device of the character described comprising a pair of heated clamping jaws adapted to be clamped over the edges of a container comprising a heat sealable packaging material, a covering of nylon fabric over the coacting surfaces of said clamping jaws, and retaining means for detachably securing said fabric to said jaws whereby the packaging material is in direct contact with only said fabric during use of the device.

9. In a heat sealing device of the character described comprising a pair of elongated heated clamping jaws adapted to be clamped over the edges of a container formed from a heat sealable packaging material, the improvement which comprises a pair of elongated nylon strips overlying the coacting surfaces of said clamping jaws, and clip means detachably engaging said jaws for frictionally retaining said nylon strips in place whereby direct contact of said surfaces with the packaging material is avoided during use of the device.

10. In the method of heat sealing a container formed from a heat sealable packaging material by momentarily clamping a pair of heated jaws over the edges of the container, the improvement which comprises interposing a protective fabric between the coacting surfaces of said jaws and the packaging material, and clamping the packaging material under pressure at a heat sealing temperature with said packaging material in direct contact only with said fabric, said fabric being heat resistant at heat sealing temperatures and being non-adherent to said packaging material whereby to avoid sticking of the packaging material to the clamping surfaces when the latter are released.

HAROLD C. SUNDSTROM.

REFERENCES CITED

The following references are of record in the file of this patent:

UNITED STATES PATENTS

| Number | Name | Date |
| --- | --- | --- |
| 2,414,157 | Marziani | Jan. 14, 1947 |
| 2,424,558 | Delano | July 29, 1947 |
| 2,441,817 | Huff | May 18, 1948 |
| 2,460,460 | Langer | Feb. 1, 1949 |
| 2,473,552 | Staw | June 21, 1949 |